(12) United States Patent
Fernandez et al.

(10) Patent No.: US 6,717,325 B2
(45) Date of Patent: Apr. 6, 2004

(54) METHOD AND APPARATUS FOR ACTUATION OF A TWO-AXIS MEMS DEVICE USING THREE ACTUATION ELEMENTS

(75) Inventors: Andres Fernandez, Dublin, CA (US); William C. Dickson, San Mateo, CA (US)

(73) Assignee: Glimmerglass Networks, Inc., Hayward, CA (US)

( * ) Notice: Subject to any disclaimer, the term of this patent is extended or adjusted under 35 U.S.C. 154(b) by 3 days.

(21) Appl. No.: 10/093,318

(22) Filed: Mar. 6, 2002

(65) Prior Publication Data

US 2003/0189389 A1 Oct. 9, 2003

(51) Int. Cl.$^7$ .......................... H02N 1/00; G02B 26/10
(52) U.S. Cl. ........................ 310/309; 359/223; 359/224; 359/290; 318/116
(58) Field of Search ......................... 310/309; 359/198, 359/199, 223, 224, 290, 291; 385/14, 18; 318/116

(56) References Cited

U.S. PATENT DOCUMENTS 5,408,355 A * 4/1995 Rauch et al. ............... 359/298
5,543,956 A * 8/1996 Nakagawa et al. .......... 359/225
6,545,385 B2 * 4/2003 Miller et al. ................ 310/309

FOREIGN PATENT DOCUMENTS

EP          0 381 212       * 8/1990      ............ G11B/7/08

OTHER PUBLICATIONS

Young et al., "Two Degrees of Freedom Optical Mirrors", Copyright Dec. 2000.*

Young, Johanna, Design, Modeling, and Experiment on Two Degree-of-Freedom MEMS Micromirror, registered Copyright 2001.*

* cited by examiner

Primary Examiner—Karl Tamai
(74) Attorney, Agent, or Firm—Townsend and Townsend and Crew LLP; Kenneth R. Allen

(57) ABSTRACT

Apparatus and methods are provided for driving a two-axis MEMS mirror using three non-contact actuation elements or electrodes. A differential bi-directional mirror control uses unipolar drive voltages biased at a suitable value. Transformation functions map two-axis tip-tilt commands to three actuation drive signals for selected electrode orientations and sizes.

13 Claims, 3 Drawing Sheets

METHOD AND APPARATUS FOR ACTUATION OF A TWO-AXIS MEMS DEVICE USING THREE ACTUATION ELEMENTS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The invention relates to actuation of a microelectromechanical system (MEMS) device, and in particular to actuation of a two-axis tip-tilt MEMS mirror. The invention finds application to electrostatically actuated optical switching, but it is not so limited.

Schemes for electrostatic and magnetic actuation of two-axis tip-tilt MEMS mirrors using four actuation elements are well known. A four element configuration has the advantage of straight-forward symmetry with respect to orthogonal tip-tilt axes, so that the transformation function between tilt orientation and applied voltage or current at each actuation element is relatively straight-forward. The general method of actuation using four electrodes is to actuate electrodes in pairs on a common side of an axis to tilt about the axis.

In order to control the individual actuation elements, each element requires its own voltage or current supply-line and associated drive circuitry. In the case of an optical switch using arrays of closely spaced mirrors, the large number of lines and drivers becomes a limiting factor in system design. Due to packing constraints, routing of the lines becomes challenging as the number of MEMS devices in the array is increased. Furthermore, the system cost scales as the number of drivers is increased due the larger number of electronic components. What is needed is a scheme to reduce the number of drivers and lines to reduce both the interconnect and driver problems.

SUMMARY OF THE INVENTION

According to the invention, a method and apparatus are provided for driving a two-axis MEMS mirror using three non-contact actuation elements or electrodes. A differential bi-directional mirror control uses three actuation drive signals biased at a suitable value. Transformation functions map two-axis tip-tilt commands to three actuation drive signals for selected electrode orientations and sizes.

Although the theoretical basis as presented here is for using three electrodes in an electrostatic drive, the theory is applicable to other cases involving two-axis tip-tilt devices, including electromagnetic actuators for MEMS devices. However, active bi-direction motion to attain full displacement can be achieved with electrostatic electrodes (which only produce attractive force) only if, for each axis of angular rotation, the electrode centers of two electrodes are on opposites sides of the axis. Therefore, the disclosure is to be understood to address the case of using three electrodes to drive a two-axis tip-tilt device of this type of axis and electrode configuration.

The invention will be better understood by reference to the following detailed description in connection with the accompanying embodiments.

DETAILED DESCRIPTION OF THE INVENTION

Figure 1:
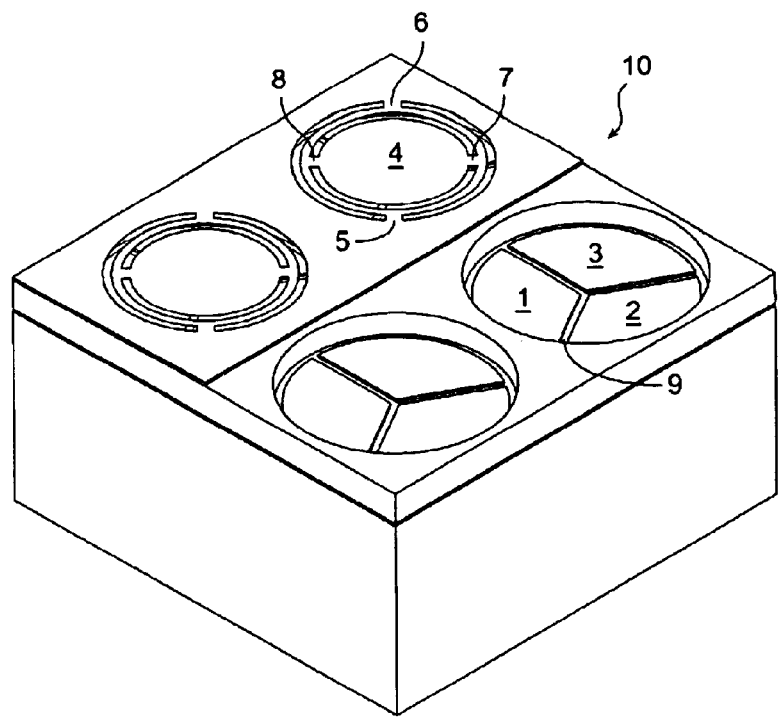
FIG. 1 is a perspective view in partial cutaway illustrating relative positioning of an array of two-axis MEMS mirrors and three drive electrodes according to the invention.
Figure 2:
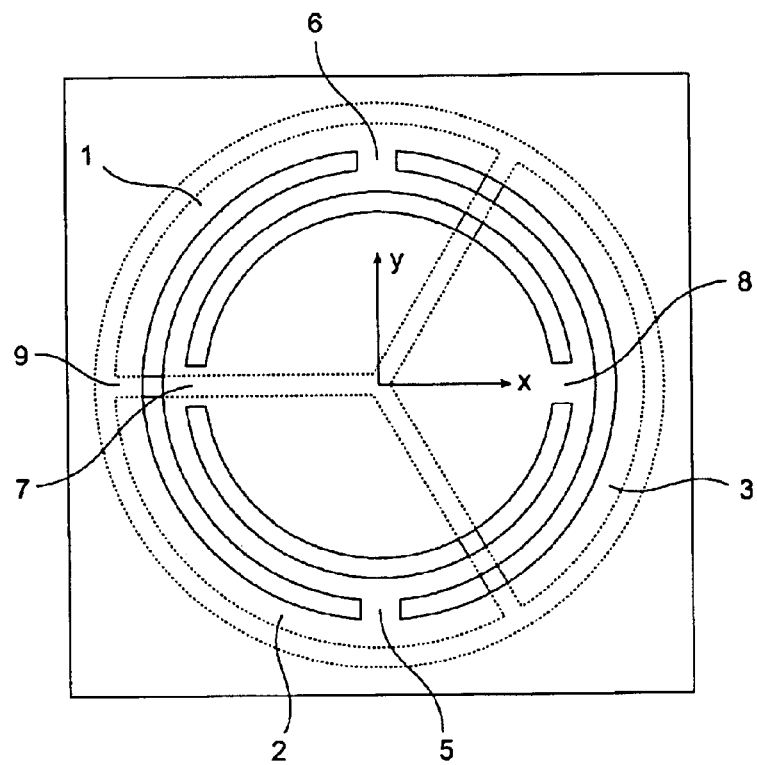
FIG. 2 is a top view of a two-axis MEMS mirror and three drive electrodes in which hinge axes are directly aligned to the electrodes according to the invention.

Referring to FIG. 1 and FIG. 2, there is shown an example of a MEMS mirror 4 in an array 10 driven by three equivalent actuation elements 1, 2, and 3. In the case of the double-gimbaled mirror shown, outer hinges 5 and 6 allow the outer ring and mirror to rotate about the y-axis, and inner hinges 7 and 8 allow the mirror 4 to rotate about the x-axis, where both x and y axes are in the plane of the mirror 4. For this particular embodiment of the invention, the x-axis of rotation is aligned to the gap 9 between elements 1 and 2 and points in the direction of element 3. In another embodiment of the invention, shown in FIG. 3, the relative orientation of the drive elements to the hinge axes is rotated by an arbitrary angle. In all embodiments of the invention, the forces that actuate the tilt of the mirror are provided by the three actuation elements 1, 2 and 3. The forces may be derived by various means including electrostatic and magnetic means. In the electrostatic case, the elements 1, 2, 3 may be flat metallic electrodes. By applying a voltage to each electrode, an electrostatic force is created between the electrode and an electrically conductive layer (not shown) in the mirror 4 (including the mirror surface itself), causing the mirror 4 to tilt through a controlled angle as hereinafter explained. In the magnetic case, the elements 1, 2, 3 may be planar circular coils of conductive traces. By applying a current from a current source to each of the coils, magnetic fields thus created interact with a ferromagnetic region (not shown) in the mirror 4 (including the mirror material itself), an interacting magnetic force is induced, causing the mirror 4 to tilt.

Figure 3:
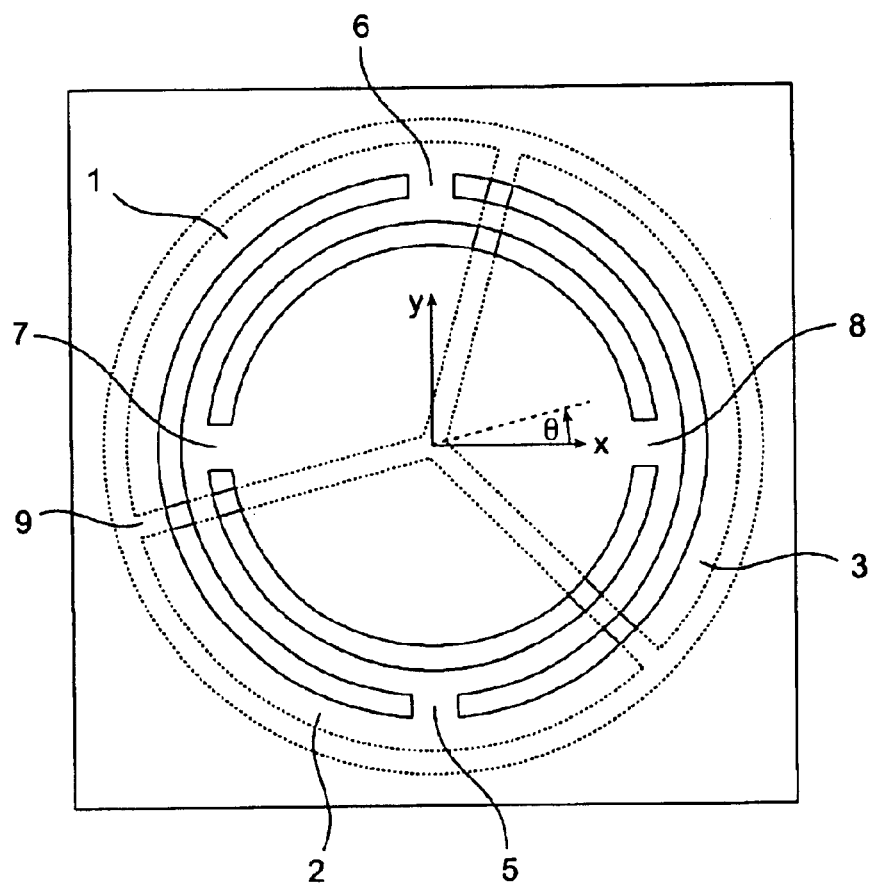
FIG. 3 is a top view of a two-axis MEMS mirror and three drive electrodes in which hinge axes are randomly aligned to the electrodes according to the invention.
Figure 4:
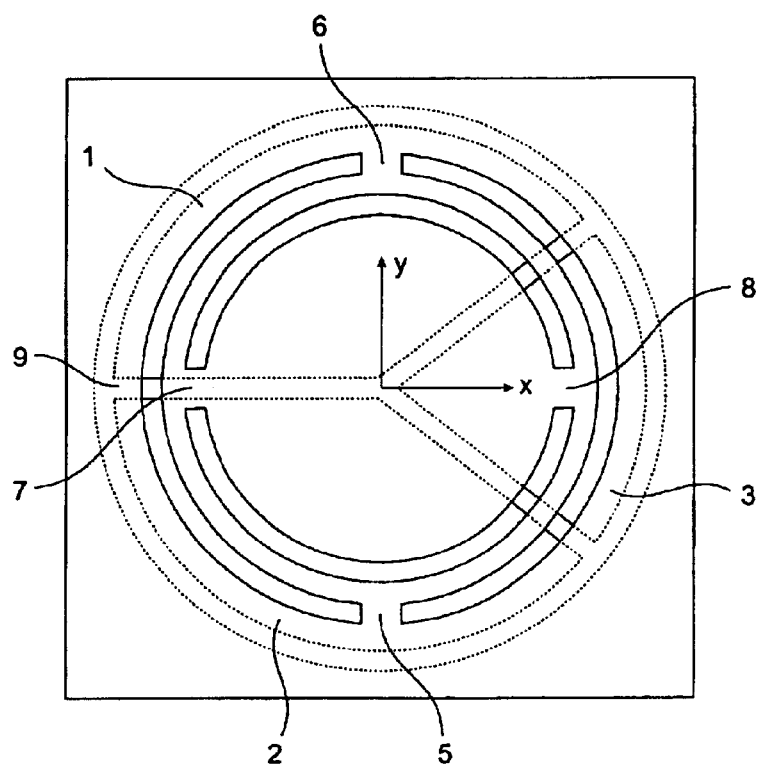
FIG. 4 is a top view of a two-axis MEMS mirror and three drive electrodes in which hinge axes are directly aligned to the electrodes and one of the electrodes is of unequal sizes according to the invention.
Figure 5:
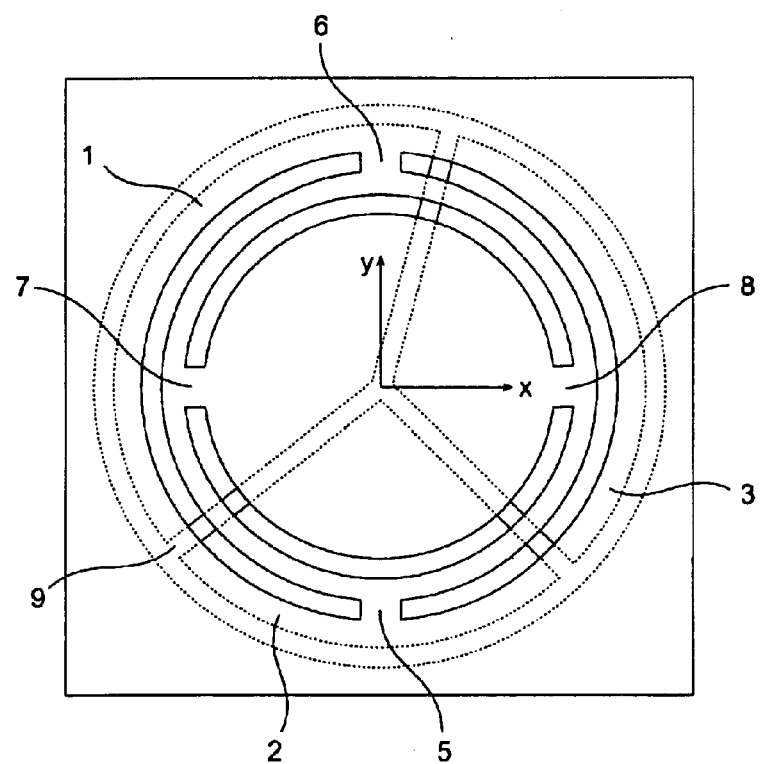
FIG. 5 is a top view of a two-axis MEMS mirror and three drive electrodes in which hinge axes are randomly aligned to the electrodes and the electrodes are of unequal sizes according to the invention.

The actuation elements need not be of equal area, as for example depicted in FIG. 4 or need they produce an equivalent amount of force for an equal drive signal. Thus, an alternative embodiment of the invention within the scope of the claims is one in which at least one of the three actuation elements is different in a significant parameter than the other two. They can differ in a variety of ways including, but not limited to, area, shape, and thickness. For example, the electrodes may be randomly aligned with respect to the axes, whether they are of equal area (FIG. 3) or of unequal area (FIG. 5).

A central aspect of the invention is the method by which the tilt of the mirror is controlled using three actuation elements. Since there are two independent rotation axes, two independent command signals are required. These command signals are defined to be $V_x$ and $V_y$ for control of rotation about the x-axis and y-axis, respectively. Key to the problem is determining how to map the command signals uniquely into the three drive signals, which are denoted as $V_1$, $V_2$ and $V_3$. These signals may be generated by selected voltage sources or current source depending on the type of actuation mechanism. The mapping can be generally represented by the following system of liner equations:

$$V_1 = AV_x + BV_y + V_{f1},$$

$$V_2 = CV_x + DV_y + V_{f2}, \text{ and}$$

$$V_3 = EV_x + FV_y + V_{f3},$$

where A, B, C, D, E, F, $V_{f1}$, $V_{f2}$, and $V_{f3}$ are all constants independent of $V_x$ and $V_y$. Any number of mapping methods could be employed. However, not all methods produce the same control characteristics. Therefore, the problem is constrained so that the following properties are maintained by the mapping:

(1) The command signal $V_x$ is coupled to effect displacement of the MEMS device only about the x-axes.

(2) The command signal $V_y$ is coupled to effect displacement of the MEMS device only about the y-axes.

(3) The command signal $V_x$ is differential so that no change in the average drive signal to the three elements occurs.

(4) The command signal $V_y$ is differential so that no change in the average drive signal to the three elements occurs.

Constraints (1) and (2) ensure that there is no or little cross-talk between the two independent rotation directions. Constraints (3) and (4) linearize the response of the system to the command signals $V_x$ and $V_y$. Both these properties, greatly simplify the feedback circuitry or algorithm needed in closed-loop operation of the mirrors.

By applying the constraints (1)–(4), the relative relationships between the constants A, B, C, D, and E are necessarily constrained, that is, they cannot assume arbitrary values. Their values also depend on the particular configuration of the actuation elements and on the relative orientation of the tilt axes to the actuation elements. For the embodiment depicted in FIG. 1 and FIG. 2, where the three elements are all equivalent and oriented as shown, for constraint (1) to be always true, it is necessary that the sum of A and C be linearly proportional to E. For constraint (2) to be true, it is necessary that B equal D. Constraint (3) implies that the sum of A, C and D equal zero, and constraint (4) implies that the sum of B, D and E equal zero. All of these conditions must be true simultaneously. For this to occur, F must be equal to −2B, C must be equal be to −A, and E must be equal to zero. Thus, the set of general equations for the mapping are reduced to the following set of equations, which is denoted as $M_1$:

$$V_1 = AV_x - (F/2)V_y + V_{f1},$$

$$V_2 = -AV_x - (F/2)V_y + V_{f2}, \text{ and}$$

$$V_3 = FV_y + V_{f3}.$$

The set of equations $M_1$ define how the two-axis command signals are mapped into the three drive signals. The bias values $V_{f1}$, $V_{f2}$, and $V_{f3}$ may be all equal in value, or one or more may be different from the others. The $M_1$ mapping applies to the case where the three actuation elements are all equivalent in shape and form, are equally spaced apart, and are oriented with respect to the tilt axes as shown in FIG. 2. It is understood that the $M_1$ mapping is unique to the element labeling system shown in FIG. 1 and FIG. 2 and to the choice of axes orientation shown in these figures. There are several permutations of element labeling and axes orientation for which this mapping applies but with trivial changes in assignment of the drive signals $V_1$, $V_2$, and $V_3$ and in the sign of the coefficients A and F.

The $M_1$ mapping described above applies only if the orientation of the actuation elements relative to the hinges is consistent with that in FIG. 2. In a generalized case, the orientation of the drive elements need not conform to that pictured in FIG. 2. The elements can be rotated with respect to the directions defined by the mirror hinge axes. An arbitrary orientation of the elements is depicted in FIG. 3, where the rotation angle θ is defined as a counter-clockwise rotation of the elements from the orientation shown in FIG. 2. In order to maintain the validity of constraints (1)–(4) despite the relative orientation of the drive elements, the mapping of the command signals to the drive signals must be modified. This is performed by applying a change of coordinate system in which the new axes are rotated by an angle θ with respect to the original axes. The resulting new mapping is described by the following new set of linear equations, which is denoted as $M_3$:

$$V_1 = (A\cos(\theta) + (F/2)\sin(\theta))V_x +$$

$$(A\sin(\theta) - (F/2)\cos(\theta))V_y + V_{f1},$$

$$V_2 = (-A\cos(\theta) + (F/2)\sin(\theta))V_x +$$

$$(-A\sin(\theta) - (F/2)\cos(\theta))V_y + V_{f2}, \text{ and}$$

$$V_3 = -F\sin(\theta)V_x + F\cos(\theta)V_x + V_{f3}.$$

The mapping described by these equations is the general form where the electrodes are of equal size in connection with control of the double-gimbaled mirror 4 by the three drive elements 1, 2, and 3. The bias values $V_{f1}$, $V_{f2}$, and $V_{f3}$ may be all equal or one or more may be different from the others.

A more specific embodiment of the invention provides a simplification to the mapping. A desirable, but not necessary, property of the mapping is that it be invariant to a rotation of the drive elements by an integral multiple of 120 degrees. From the symmetry of the three elements, if the drive elements are rotated by an integral multiple of 120 degrees with respect to the mirror hinges, the new configuration is completely equivalent to the unrotated configuration except for an inconsequential change in the labeling of the elements. For the mapping to remain unchanged, except for an inconsequential permutation of the labels 1, 2 and 3, then the ratio of the constant A to the constant F must be constrained to equal to $\sqrt{3}/2$. Thus one specific type of mapping contemplated by this invention is described by the following set of linear equations, which is denoted as $M_4$:

$$V_1 = F\big((\sqrt{3}/2)\cos(\theta) + (1/2)\sin(\theta)\big)V_x +$$

$$F\big((\sqrt{3}/2)\sin(\theta) - (1/2)\cos(\theta)\big)V_y + V_f,$$

$$V_2 = F\big(-(\sqrt{3}/2)\cos(\theta) + (1/2)\sin(\theta)\big)V_x +$$

$$F\big(-(\sqrt{3}/2)\sin(\theta) - (1/2)\cos(\theta)\big)V_y + V_f, \text{ and}$$

$$V_3 = -F\sin(\theta)V_x + F\cos(\theta)V_x + V_f.$$

It is this unique mapping for which constraints (1)–(4) are maintained in addition to being invariant to a rotation of the drive elements by an integral multiple of 120 degrees.

Mapping $M_4$ only applies to the case where the drive elements are all equivalent and equally spaced as depicted in FIG. 3.

The invention has been explained with reference to specific embodiments. Other embodiments will be evident to those of ordinary skill in the art. For example, the invention is not specific to a double-gimbaled mirror. A different relative orientation of the mirror axes and three electrodes from what was described is permissible, which results in different coefficients in the mapping between the two differential commands and the three electrode commands. It is therefore not intended that this invention be limited, except as indicated by the appended claims.

What is claimed is:

1. An apparatus with two axes of controllable bi-directional angular displacement comprising:
   a platform susceptible of angular displacement around the two axes in response to actuation;
   first, second, and third electrostatic electrodes located in proximity to the platform to provide direct noncontact actuation to the platform using only said three electrodes wherein each of said two axes of angular displacement separates centers of at least two of said electrodes in order to permit active bi-directional angular displacement;
   three voltage control sources operative to provide independent control of three corresponding electrostatic forces to the first, second and third electrodes; and
   controller for mapping selected positions relative to the two axes of angular displacement to the three electrostatic forces.

2. The apparatus according to claim 1 wherein two of the electrodes are of unequal area relative to a first one of the electrodes.

3. The apparatus according to claim 1 wherein the first one of said electrodes is disposed in direct alignment with a first one of the axes and the second electrode and the third electrode are each disposed symmetrically on opposing sides of the first one of the axes.

4. The apparatus according to claim 1 wherein the electrodes are of unequal area and are disposed such that gaps between electrodes do not coincide with the axes.

5. The apparatus according to claim 1 wherein the platform is further susceptible of displacement along a z axis substantially normal to the plane of the unbiased platform such that the platform has a reciprocating mode along the z-axis.

6. The apparatus according to claim 1 wherein the control means is operative to map according to the following relation:

$$V_1 = F((\sqrt{3}/2)\mathrm{Cos}(\theta)+(1/2)\mathrm{Sin}(\theta))V_x + F$$
$$((\sqrt{3}/2)\mathrm{Sin}(\theta)-(1/2)\mathrm{Cos}(\theta))V_y + V_{f1},$$
$$V_2 = F(-(\sqrt{3}/2)\mathrm{Cos}(\theta)+(1/2)\mathrm{Sin}(\theta))V_x + F$$
$$(-(\sqrt{3}/2)\mathrm{Sin}(\theta)-(1/2)\mathrm{Cos}(\theta)V_y + V_{f2},$$

and $$V_3 = -F\,\mathrm{Sin}(\theta)V_x + F\,\mathrm{Cos}(\theta)V_x + V_{f3}$$

where F and bias values $V_{f1}$, $V_{f2}$, and $V_{f3}$ are all constants independent of angular displacement command signals $V_x$ and $V_y$;
wherein said electrodes are of equal area and mapping is invariant to rotation of said electrodes around a central z axis by multiples of 120 degrees.

7. The apparatus according to claim 1 wherein all of the electrodes are of equal area and are disposed such that gaps between electrodes do not coincide with the axes.

8. A method for linearized control of an apparatus with two axes of controllable bi-directional angular displacement, the apparatus having a platform susceptible of angular displacement around the two axes in response to actuation, three electrodes located in proximity to the platform to provide direct noncontact actuation to the platform, wherein each of said two axes of angular displacement separates centers of at least two of said electrodes in order to provide active bi-directional angular displacement over a maximum possible angular range, only three voltage control sources operative to provide independent control forces to the three electrodes, and a controller for mapping selected positions relative to the two axes of angular displacement to the three control forces, the method comprising the steps of:
   selecting an angle of displacement of the platform;
   mapping the angle of displacement to angle commands for displacement around an x axis and a y axis;
   mapping the two angle commands according a specified mapping function from first and second controllable angles to only three electrode voltages for producing angle-inducing electrode voltage commands for use to directly control the first and second controllable angles without contact to said platform; and
   applying said angle-inducing electrode voltage commands to said three control source for said electrodes to electrostatically vary angular displacement of the platform over said first and second controllable angles.

9. The method according to claim 8 wherein the controller is operative to map according to the following relation among electrode voltages $V_1$, $V_2$, $V_3$ of said three voltage control sources:

$$V_1 = AV_x + BV_y + V_{f1},$$
$$V_2 = CV_x + DV_y + V_{f2}, \text{ and}$$
$$V_3 = EV_x + FV_y + V_{f3},$$

where A, B, C, D, E, F, and bias values $V_{f1}$, $V_{f2}$, and $V_{f3}$ are all constants independent of angular displacement command signals $V_x$ and $V_y$.

10. An apparatus with two axes of controllable bi-directional angular displacement comprising:
   a platform susceptible of angular displacement around the two axes in response to actuation;
   first, second, and third electrostatic electrodes located in proximity to the platform to provide noncontact actuation to the platform wherein each of said two axes of angular displacement separates centers of at least two of said electrodes in order to permit active bi-directional angular displacement;
   three voltage control sources operative to provide independent control of three corresponding electrostatic forces to the first, second and third electrodes; and
   controller for mapping selected positions relative to the two axes of angular displacement to the three electrostatic forces wherein the controller is operative to map according to the following relation among electrode voltages $V_1$, $V_2$, $V_3$ of said three voltage control sources:

$$V_1 = AV_x + BV_y V_{f1},$$
$$V_2 = CV_x + DV_y + V_{f2}, \text{ and}$$
$$V_3 = EV_x + FV_y + V_{f3},$$

where A, B, C, D, E, F, and bias values $V_{f1}$, $V_{f2}$, and $V_{f3}$ are all constants independent of angular displacement command signals $V_x$ and $V_y$.

11. The apparatus according to claim 10 wherein the first electrode is disposed in direct alignment with the first one of the axes and wherein the second electrode and the third electrode are each disposed symmetrically on opposing sides of the first one of the axes.

12. An apparatus with two axes of controllable bi-directional angular displacement comprising:

a platform susceptible of angular displacement around the two axes in response to actuation;

first, second, and third electrostatic electrodes located in proximity to the platform to provide noncontact actuation to the platform wherein each of said two axes of angular displacement separates centers of at least two of said electrodes in order to permit active bi-directional angular displacement;

three voltage control sources operative to provide independent control of three corresponding electrostatic forces to the first, second and third electrodes; and controller for mapping selected positions relative to the two axes of angular displacement to the three electrostatic forces wherein the controller is operative to map according to the following relation:

$$V_1 = (A\ \text{Cos}(\theta) + (F/2)\text{Sin}(\theta))V_x + (A\ \text{Sin}(\theta) - (F/2)\text{Cos}(\theta)V_y + V_{f1},$$

$$V_2 = (-A\ \text{Cos}(\theta) + (F/2)\text{Sin}(\theta))V_x + (-A\ \text{Sin}(\theta) - (F/2)\text{Cos}(\theta)V_y + V_{f2},$$

and $$V_3 = -F\ \text{Sin}(\theta)V_x + F\ \text{Cos}(\theta)V_x + V_{f3},$$

where A, F, and bias values $V_{f1}$, $V_{f2}$, and $V_{f3}$ are all constants independent of angular displacement command signals $V_x$ and $V_y$;

wherein said electrodes are of equal area and are disposed such that gaps between electrodes do not coincide with the two axes.

13. An apparatus with two axes of controllable bi-directional angular displacement comprising:

a platform susceptible of reorientation around the two axes in response to actuation;

first, second, and third actuation elements located in proximity to the platform to provide noncontact actuation to the platform;

three control sources operative to provide independent control forces to the first, second and third actuation elements; and a controller for mapping selected positions relative to the two axes of angular displacement to the three control forces according to the following relation:

$$V_1 = F((\sqrt{3}/2)\text{Cos}(\theta) + (1/2)\text{Sin}(\theta))V_x + F((\sqrt{3}/2)\text{Sin}(\theta) - (1/2)\text{Cos}(\theta))V_y + V_{f1},$$

$$V_2 = F(-(\sqrt{3}/2)\text{Cos}(\theta) + (1/2)\text{Sin}(\theta))V_x F$$

$$(-(\sqrt{3}/2)\text{Sin}(\theta) - (1/2)\text{Cos}(\theta)V_y + V_{f2},$$

and $$V_3 = -F\ \text{Sin}(\theta)V_x F\ \text{Cos}(\theta)V_x + V_{f3}$$

where F and bias values $V_{f1}$, $V_{f2}$, and $V_{f3}$ are all constants independent of angular displacement command signals $V_x$ and $V_y$; and wherein said actuation elements are of equal area and mapping is invariant to rotation of said actuation elements around a central z axis by multiples of 120 degrees.

* * * * *